Nov. 7, 1944.   D. E. DAVIS   2,362,360
AWNING FOR CHILDREN'S VEHICLES
Filed Aug. 25, 1943   2 Sheets-Sheet 1
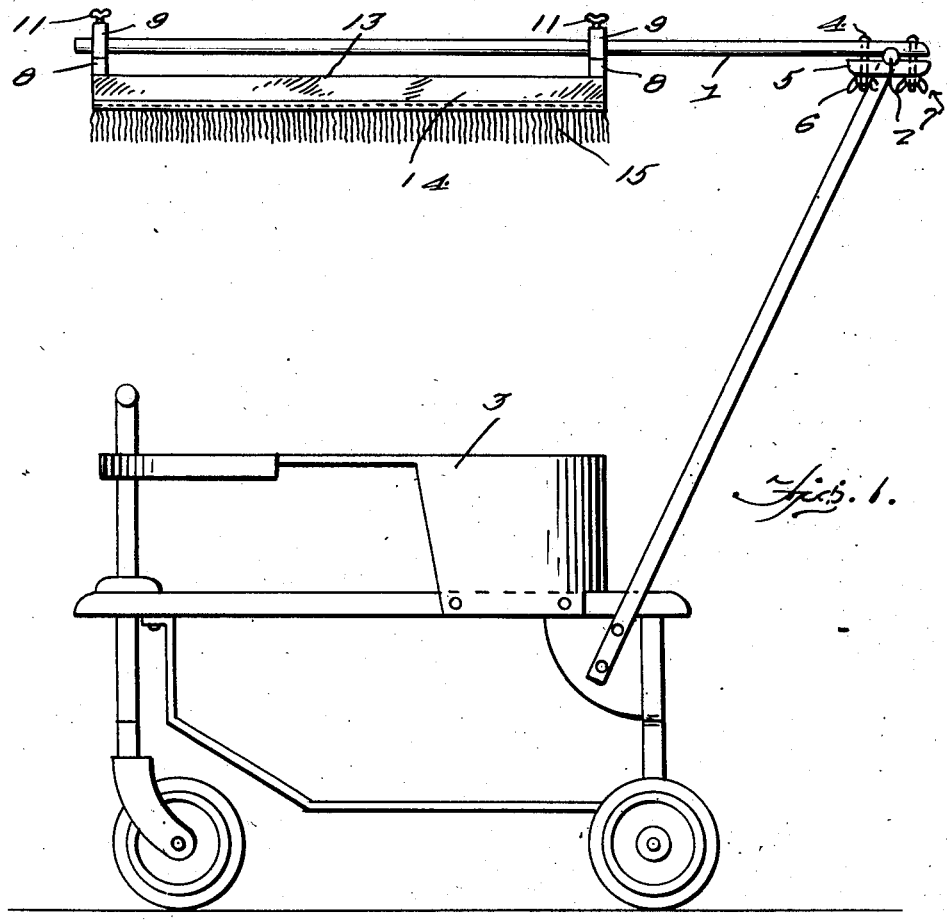
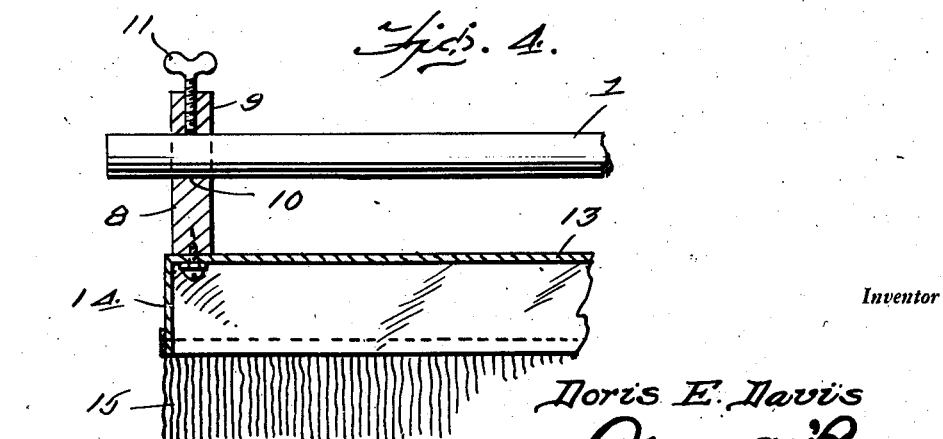
Inventor
Doris E. Davis Nov. 7, 1944. D. E. DAVIS 2,362,360
AWNING FOR CHILDREN'S VEHICLES
Filed Aug. 25, 1943 2 Sheets-Sheet 2

Inventor
Doris E. Davis
By Clarence A. O'Brien
and Harvey B. Jackson
Attorneys

Patented Nov. 7, 1944

2,362,360

UNITED STATES PATENT OFFICE 2,362,360

AWNING FOR CHILDREN'S VEHICLES

Doris E. Davis, Coral Gables, Fla.

Application August 25, 1943, Serial No. 499,989

3 Claims. (Cl. 135—7.1)

The present invention relates to new and useful improvements in awnings for children's vehicles, and has for one of its important objects to provide, in a manner as hereinafter set forth, an awning of this character which is adapted to be expeditiously mounted on the usual handle of the vehicle.

Another very important object of the invention is to provide an awning of the aforementioned character which is capable of substantially universal adjustment to meet various conditions.

Still another very important object of the invention is to provide an awning of the character described which, when not in use, will occupy a minimum of space.

Other objects of the invention are to provide an adjustable, removable awning for children's vehicles which will be comparatively simple in construction, strong, durable, highly efficient and reliable in use, compact, light in weight, attractive in appearance, and which may be manufacture at low cost.

All of the foregoing, and still further objects and advantages of the invention will become apparent from a study of the following specification, taken in connection with the accompanying drawing wherein like characters of reference designate corresponding parts throughout the several views, and wherein:

Figure 1 is a view in side elevation, showing an awning constructed in accordance with the present invention mounted on a child's vehicle.

Figure 4 is a fragmentary view in vertical longitudinal section through the forward end portion of the device.

Figure 2:
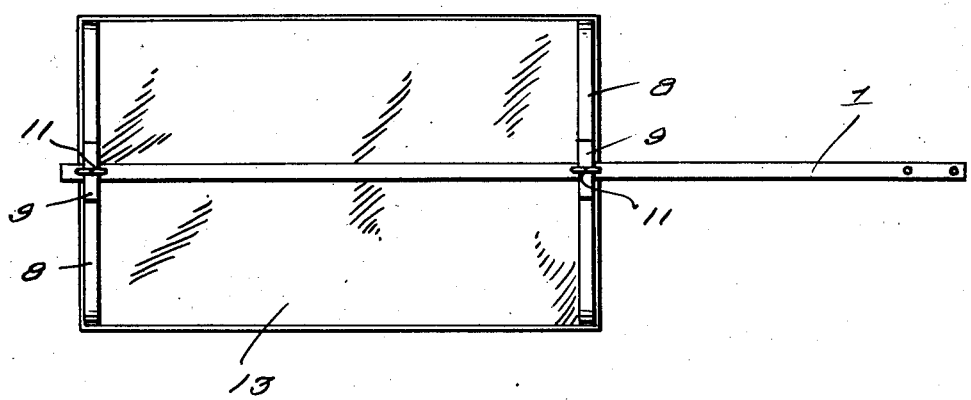
Figure 2 is a top plan view of the device.
Figure 3:
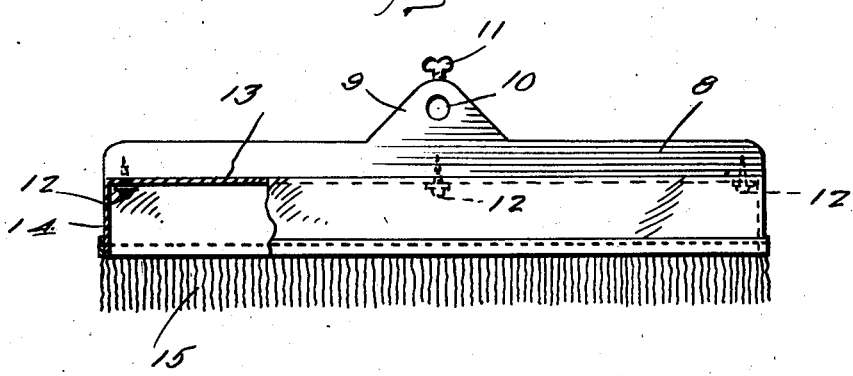
Figure 3 is an end elevational view of the awning with a portion broken away in section.
Figure 5:
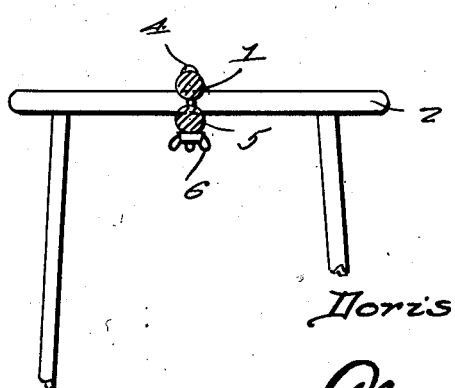
Figure 5 is a cross sectional view, showing the means for securing the device on the handle of the vehicle.

Referring now to the drawing in detail, it will be seen that the embodiment of the invention which has been illustrated comprises a supporting rod 1 in the form of a pole of wood or other suitable material. The supporting rod 1 is adapted to be adjustably and removably mounted on the usual handle 2 of a child's vehicle 3. Toward this end, longitudinally spaced bolts 4 are mounted in the inner or rear end portion of the rod 1. A jaw 5 in the form of a bar of suitable material is slidably mounted on the bolts 4 and engaged beneath the handle 2. Then, wing nuts 6 are threaded on the bolts 4 for tightly clamping the jaw 5 against the handle 2. The elements 4, 5 and 6 constitute what may be considered a clamp which is designated generally by reference numeral 7. The rod 1 and the jaw 5 have formed therein opposed, segmental recesses which accommodate the handle 2.

Bars 8 are mounted transversely beneath the supporting rod 1 at longitudinally spaced points. The bars 8 include upstanding ears 9 having circular openings 10 therein which accommodate the rod 1. Set screws 11 in the ears 9 secure the bars 8 in position on the rod 1. Thus, the removable bars 8 are capable of sliding and rotating adjustment on the rod 1.

Secured by screws 12 beneath the bars 8 is a sheet 13 of canvas or other suitable flexible material. The sheet 13 includes a depending marginal skirt 14 having secured thereon an ornamental fringe 15.

It will thus be seen that an awning has been provided which may be expeditiously mounted for use on the vehicle 3. By loosening the wing nuts 6, the rod 1 may be swung vertically or adjusted laterally on the usual handle 2 of the vehicle. The construction and arrangement is such as to interfere in no way with gripping the handle 2 for pushing the vehicle 3, nor will the vision be obstructed. By simply loosening the set screws 11, the bars 8 may be moved longitudinally or rocked on the supporting rod 1 for adjusting the awning as may be desired.

It is believed that the many advantages of an awning constructed in accordance with the present invention will be readily understood, and although a preferred embodiment of the device is as illustrated and described, it is to be understood that changes in the details of construction and in the combination and arangement of parts may be resorted to which will fall within the scope of the invention as claimed.

What is claimed is:

1. An awning support of the character described comprising a supporting rod, means for securing said rod on a child's vehicle, and a pair of bars mounted transversely on the supporting rod at longitudinally spaced points and adapted for attaching an awning thereto.

2. An awning support of the character described comprising a supporting rod, means for securing said rod on a child's vehicle, a pair of bars adapted for attaching an awning to the lower edges thereof, apertured ears rising from said bars and rotatably and slidably mounted on the rod for mounting the bars transversely thereunder, and set screws threadedly mounted in the ears and engaged with the rod for securing the bars in adjusted position thereon.

3. An awning support of the character described comprising a rod engageable, at one end, with a handle of a child's vehicle, bolts depending from the rod on opposite sides of the handle, a jaw slidable on the bolts and engaged beneath the handle, wing nuts threadedly mounted on the bolts for clamping the jaw against the handle for adjustably and removably securing the rod thereon, a pair of bars adapted for attaching an awning to the lower edges thereof, ears on the bars rotatably and slidably mounted on the rod for mounting said bars transversely therebeneath, and means for securing the ears in adjusted position on the rod.

DORIS E. DAVIS.